(12) United States Patent
Mataya et al.

(10) Patent No.: US 7,393,494 B2
(45) Date of Patent: *Jul. 1, 2008

(54) CLOSED MOLDING TOOL

(75) Inventors: Robert F. Mataya, Nixa, MO (US); Tommy Morphis, Springfield, MO (US)

(73) Assignee: Tracker Marine LP, Springfield, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/566,970

(22) Filed: Dec. 5, 2006

(65) Prior Publication Data

US 2007/0090563 A1   Apr. 26, 2007

Related U.S. Application Data

(63) Continuation of application No. 10/795,858, filed on Mar. 8, 2004, now Pat. No. 7,160,498.

(51) Int. Cl.
  *B29C 70/44* (2006.01)
(52) U.S. Cl. ........................ 264/510; 264/571
(58) Field of Classification Search ................. 264/510
  See application file for complete search history.

(56) References Cited

U.S. PATENT DOCUMENTS

| | | | |
|---|---|---|---|
| 2,495,640 A | 1/1950 | Muskat | |
| 2,913,036 A | 11/1959 | Smith | |
| 3,004,295 A | 10/1961 | Bottoms et al. | |
| 3,137,898 A | 6/1964 | Geringer | |
| 3,342,787 A | 9/1967 | Muskat | |
| 4,132,755 A | 1/1979 | Johnson | |
| 4,238,437 A | 12/1980 | Rolston | |
| 4,311,661 A | 1/1982 | Palmer | |
| 4,312,829 A | 1/1982 | Fourcher | |
| 4,359,437 A | 11/1982 | Le Comte | |
| 4,622,091 A | 11/1986 | Letterman | |
| 4,759,893 A | 7/1988 | Krauter | |
| 4,873,044 A | 10/1989 | Epel | |
| 4,886,442 A | 12/1989 | McCowin et al. | |
| 4,902,215 A | 2/1990 | Seemann, III | |
| 4,942,013 A | 7/1990 | Palmer | |

(Continued)

FOREIGN PATENT DOCUMENTS

GB  1432333  10/2006

(Continued)

*Primary Examiner*—Monica A Huson
(74) *Attorney, Agent, or Firm*—Husch Blackwell Sanders LLP

(57) ABSTRACT

A flexible molding component used with a base mold improves on existing methods of forming fiber reinforced composite parts. The molding component is formed of a flexible body structure having an interfacing surface and a perimeter region including a perimeter seal configured for sealing engagement with the base mold. Resin and vacuum distribution channels are formed in the interfacing surface to deliver resin to a fiber lay up disposed on the base mold and draw the resin across and through the lay up, respectively, to properly mix the resin/fiber combination which forms the desired part. Application of the vacuum causes the perimeter seal of the flexible body structure to sealingly engage with the base mold to enclose materials between the body structure and the mold, as well as causing the interfacing surface to draw against the resin/fiber combination, and the mold to shape the combination into the desired part.

22 Claims, 3 Drawing Sheets

U.S. PATENT DOCUMENTS

| | | | |
|---|---|---|---|
| 4,944,822 A * | 7/1990 | Ishikawa et al. ............ 156/212 |
| 4,975,311 A | 12/1990 | Lindgren |
| 5,052,906 A | 10/1991 | Seemann |
| 5,316,462 A | 5/1994 | Seemann |
| 5,354,195 A | 10/1994 | Dublinski et al. |
| 5,439,635 A | 8/1995 | Seemann |
| 5,464,337 A | 11/1995 | Bernardon et al. |
| 5,576,030 A | 11/1996 | Hooper |
| 5,588,392 A | 12/1996 | Bailey |
| 5,601,852 A | 2/1997 | Seemann |
| 5,702,663 A * | 12/1997 | Seemann .................... 264/510 |
| 5,716,488 A | 2/1998 | Bryant |
| 5,721,034 A | 2/1998 | Seemann, III et al. |
| 5,770,243 A | 6/1998 | Butterworth |
| 5,904,972 A | 5/1999 | Tunis, III et al. |
| 5,958,325 A | 9/1999 | Seemann, III et al. |
| 6,723,273 B2 | 4/2004 | Johnson et al. |
| 6,773,655 B1 | 8/2004 | Tunis, III et al. |
| 2003/0122285 A1 | 7/2003 | Crane et al. |
| 2005/0086916 A1 | 4/2005 | Caron |

FOREIGN PATENT DOCUMENTS

WO      WO 00/71329      11/2000

* cited by examiner

CLOSED MOLDING TOOL

CROSS-REFERENCE TO RELATED APPLICATIONS

This application is a continuation of and claims priority to U.S. patent application Ser. No. 10/795,858, filed on Mar. 8, 2004 now U.S. Pat. No. 7,160,498, which application is hereby incorporated by reference to the extent permitted by law.

BACKGROUND OF THE INVENTION

The production of fiber reinforced composite components, and in particular those components formed of a fiber/resin combination, have traditionally been accomplished by a number of open and closed molding lamination processes, or variations of each. Examples of these components include those used in the boating industry; such as fiber reinforced plastic sheets and parts with a compound shape used to manufacture a hull for a watercraft. These molding processes all involve a fiber reinforcement (e.g., fiberglass pieces) being laid up against a mold (e.g., a female mold) that provides the desired shape for the component, and the impregnation of the fiber with resin or a similar material. After curing, the resin/fiber combination forms a finished part that can be removed from the mold. Apart from these similarities, however, molding processes are distinct in the efficiencies provided by each, as well as in the disadvantages or tradeoffs encountered when choosing a molding process for fabricating a specific type or run of a component.

Open molding lamination processes are traditionally more labor intensive than other molding processes and usually produce less consistent part quality in high volume production. Open molding processes are also falling out of favor with manufacturers due to the high emissions of volatile organic compounds (VOC) realized in part production. One proposed solution was to use component materials that resulted in fewer VOC emissions, but this has resulted in parts having poor physical characteristics. Still, despite these disadvantages, open molding processes—along with vacuum bag molding—are generally the only widely used molding processes that are capable of producing low volume or low run parts in a cost effective manner.

Vacuum bag molding is a type of closed molding technique that involves forming a thin flexible bag to cover the mold upon which the fiber lay up is positioned. The edges of the bag are then clamped, taped or otherwise secured to the mold to form a sealed envelope surrounding the fiber lay up. One or more vacuum supply lines are usually installed within the bag to apply a vacuum on the bag interior concomitant with catalyzed liquid plastic or resin being introduced into the bag through a resin supply line to impregnate the fiber lay up. The vacuum draws the bag against the resin/fiber combination and surface of the mold to shape the combination into the desired part. The resin supply lines are typically positioned to introduce resin either at the perimeter of the part such that the vacuum supply line draws the resin across and through the fiber lay up towards the center of the part, or vice versa, with the resin introduced at the center of the part and vacuum drawing the resin towards the perimeter of the part. Vacuum bag molding can usually be categorized as either utilizing, (1) a thin disposable bag made from sheet film, or (2) a reusable bag made from silicone, both of which are flexible bags. Because the resin and fiber are essentially sealed off from the surrounding environment, vacuum bag molding techniques expose tool operators to significantly fewer VOC's than with open molding processes, which is a significant reason why vacuum bag techniques have gained interest in recent years.

When using a disposable vacuum bag, a peel ply release film and a resin flow/bleeder media must often be stacked atop the fiber lay up below the bag because of the nature of the thin sheet film to conform very tightly to the fiber layer up and make resin flow very difficult. The resin flow/bleeder media facilitates flow of the resin across and through the fiber lay up in a timely manner by essentially forming a resin passageway, and the peel ply film ensures that both the media and peel ply layer itself may be easily pulled off of the finished part without undue effort. Additionally, resin and vacuum distribution lines extending from the supply lines and routed beneath the vacuum bag across the mold are often needed in addition to the resin flow/bleeder media to properly distribute the resin and apply the vacuum draw beneath the tightly drawn thin sheet film. Also, adhesive sealant tape is typically applied around the perimeter of the bag to form an airtight seal with the mold and facilitate proper vacuum operation.

Despite the high quality of the part produced using disposable vacuum bag molding techniques (i.e., having a high fiber to resin ratio), certain disadvantages are apparent. For example, many of the aforementioned components used in disposable vacuum bag techniques—including the vacuum bag having resin and vacuum supply lines integrally formed therewith, the resin flow/bleeder media, the peel ply film, the resin and vacuum distribution lines and the adhesive sealant tape—are disposed of after molding only a single part, making this technique prohibitively expensive for all but high margin parts manufacturing. Significant labor is also necessary when using a disposable bag, as the bag must be made by hand to fit the particular base mold and also installed by hand with the resin flow/bleeder media, peel ply film, resin and vacuum distribution lines and sealant tape at the proper positions for the vacuum draw and resin impregnation of the fiber lay up to work. Furthermore, if the female mold has a complex shape, many pieces of sheet film may need to be cut and bonded together with sealant tape to produce a bag with the desired shape, thereby significantly increasing manufacturing time per part as compared to open molding processes.

Silicone bags implemented in vacuum bag molding techniques provide the distinct advantage of being reusable, such that multiple parts may be produced with the mold using just one bag. This provides a saving in labor as compared to disposable sheet film bags. The silicone bag is typically fabricated from silicone sheet or a brushable silicone liquid, but because silicone alone usually does not have enough strength to withstand the vacuum draw in the molding process, a reinforcement such as nylon mesh or other materials is often laminated with the silicon. Another problem with silicone is that even with a reinforcement, the bag tends to have a relatively short life and is useful for only small part production runs; the silicone bag is easily damaged in the production environment, difficult to have resin and vacuum supply and distribution lines integrated therewith, and tends to expand dimensionally over a number of production runs, requiring significant maintenance to keep the bag usable for the molding process. As with disposable vacuum bags, adhesive sealant tape or other adhesives must still be used when sealing the silicone bag perimeter to the mold to form an airtight seal for vacuum operation. Silicone materials are also expensive, leading to a high initial cost of fabricating the vacuum bag. Also, silicone bags require oven curing in the fabrication of the more durable materials, which adds further to the cost of the process with the additional time, energy and equipment requirements.

Yet another closed molding process, resin transfer molding, involves using rigid male and female molds together to produce fiber reinforced composite parts. A fiber lay up is placed on the female mold and the male mold is brought into contact with the female mold and clamped or otherwise secured therewith so that a closed space is formed between the molds. Then, a mixed resin and catalyst are injected into the closed space under relatively low pressure. Upon curing of the resin, the molds are separated and the part is removed. The resin transfer molding process is more environmentally friendly than traditional open molding processes, with the capture of any VOC's present in the closed space occurring before the molds are separated to reveal the finished part. One significant disadvantage of resin transfer molding, however, is that because the male and female molds are rigid, if the fiber load of the lay up is not precisely the correct quantity at the correct position, structural weakness in the part occur. For example, "dry spots" occur where the resin cannot flow to during the injection process if the fiber density is too high, and if the fiber density is too low, a spot filled with resin will develop. Both dry spots and resin filled spots in finished parts are susceptible to fracture or other structural failures at relatively low force loads. These structural weaknesses are even more important when fabricating large parts, such as boat hull components, where the weight of the part itself may facilitate structural failures. Matched, rigid tooling is very expensive to produce and, therefore, the process is less amenable to changes that may be required for structural, process, or styling updates.

Current closed molding lamination techniques do not provide an economical and reliable solution for fabricating fiber reinforced composite parts, especially with respect to small to medium part runs. A molding technique is needed that balances tool cost considerations with reliability and speed in the part fabrication process.

SUMMARY OF THE INVENTION

A flexible molding component is provided for use with a base mold to form a fiber reinforced composite part. The molding component tool is formed of a flexible body structure having an interfacing surface and a perimeter region including a perimeter seal configured for sealing engagement with the base mold. Resin and vacuum distribution channels are formed in the interfacing surface to deliver resin to a fiber lay up disposed on the base mold and draw the resin across and through the lay up, respectively, to properly mix the resin/fiber combination which forms the desired part. Application of the vacuum causes the perimeter seal of the flexible body structure to sealingly engage with the base mold to enclose material between the body structure and the mold, as well as causing the body structure interfacing surface to draw against the resin/fiber combination and the mold to shape the materials combination into the desired part. A standoff having a plurality of passages formed therein may also be formed in the interfacing surface of the body structure to facilitate the movement of resin between resin distribution channels or otherwise across and through the fiber lay up towards regions where vacuum pressure is applied. To form the body structure with enough flexibility to draw against the mold and generate a sufficient engagement of the perimeter seal, but firm enough as to not require the use of resin flow/bleeder media to enable proper resin flow, the molding component may be formed of a material such as polyurea, polyurethane, a polyurea/polyurethane compound, or materials with similar physical characteristics.

The molding component tool provides many advantages in closed molding processes, including: reusability for producing a large run of parts; having sufficient flexibility and flange requirements to be compatible with many existing "A" surface open molding process tooling (typically, but not always, a conventional female mold); incorporating integral, molded vacuum perimeter seals, resin and vacuum distribution channels, and standoff passageways into the flexible body structure as a continuously molded single unit, without the need to separately fit components to the body structure or fabricate internal tool reinforcements; having a structural design that can be engineered to generate a high degree of design and manufacturing tolerance flexibility in molding parts, such as various surface finishes, various degrees of contour conformability, molding pressure variations, mold elongation and compression, or other physical properties applied either to a part as a whole, or certain portions of the part, without requiring tool modifications or replacement; being formed of materials that are sprayable, brushable, castable and/or pourable to form the component tool; fabrication without the added expense of providing large curing ovens; having increased durability and being essentially chemically inert—so as not to bond with polyester and other commonly used resins—and easier to repair than conventional silicone bags; and acceptable to further possessing compatibility with ultra violet (UV) and/or forced thermal curing of gel coats and resins.

Fiber reinforced composite components fabricated according to the present invention may find application in many industries, including marine, automotive, recreational vehicle, aircraft, industrial, and the like. The molding component tool enables a closed molding process to be implemented that reduces expense and the labor of replacing disposable tooling (e.g., vacuum bag and associated components), is more environmentally friendly than open molding processes, uses tooling that is more durable, less expensive, and less complex than silicone vacuum bag tooling, and provides a high degree of consistency in finished part structural integrity as compared to resin transfer molding techniques. The molding tool provides the capability to close mold parts with many base mold tools used with the less desirable open molding methodology without costly base mold modification or replacement. Due to the flexible nature of the tool, significant part design flexibility exists without the need to manufacture a new "B" tool.

DETAILED DESCRIPTION OF THE INVENTION

Figure 1:
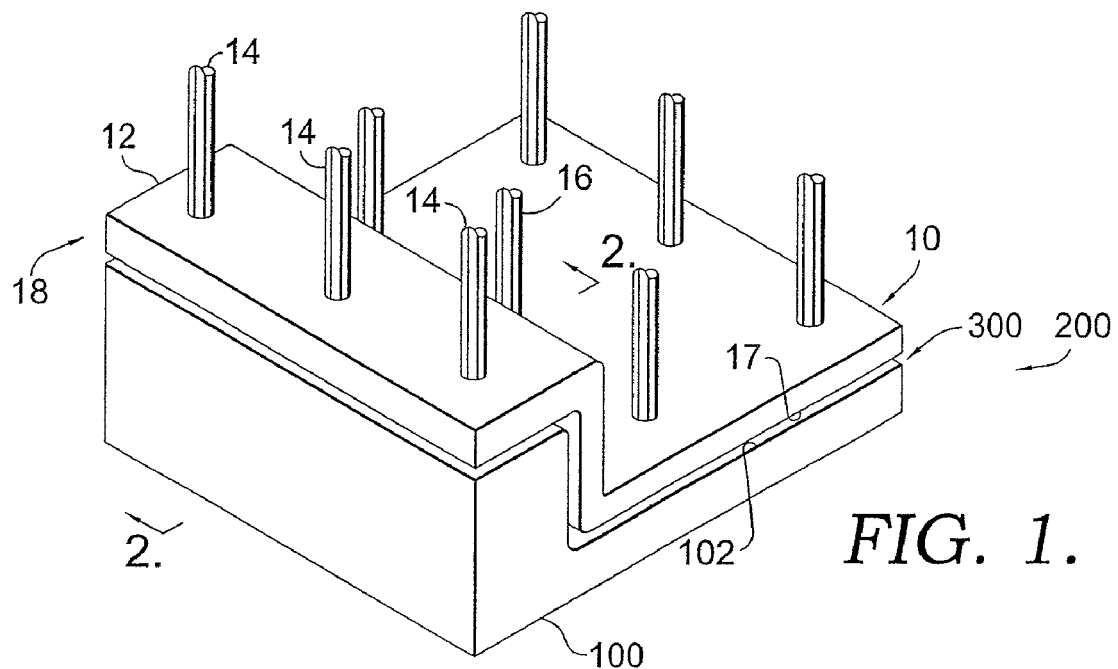
FIG. 1 is a perspective view of a molding component of the present invention interfacing with a base mold to form a fiber reinforced composite part.

The present invention improves on the materials and techniques implemented in traditional vacuum bag molding by providing, in a closed molding process, a flexible molding component or tool configured for use with a base mold tool to form a fiber reinforced composite part. With reference to FIG. 1, a flexible molding component 10 is shown in use with a base mold 100—in this particular example, a rigid female mold—to form a closed molding tooling system 200 for part fabrication. The base mold 100 may also be referred to as an "A" surface tool while the molding component 10 may also be referred to as a "B" surface tool, regardless of which surface tool would be considered either a male mold or a female mold is a specific tooling configuration.

Figure 2:
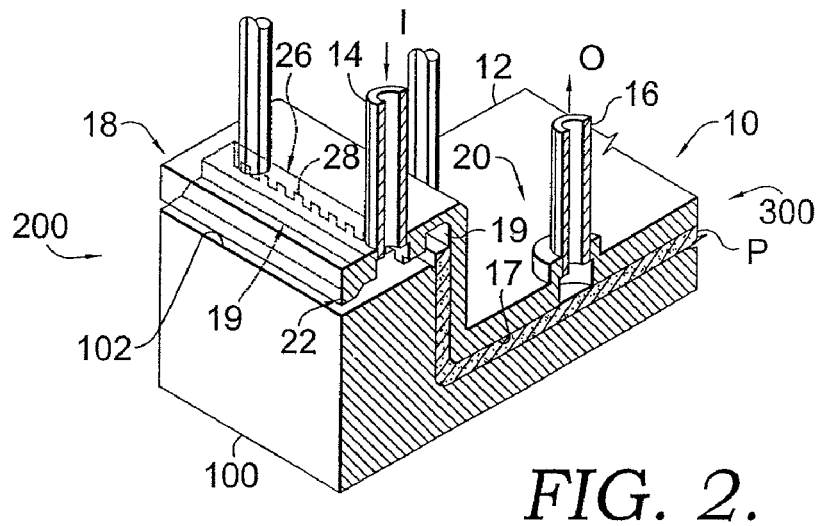
FIG. 2 is a perspective cross-sectional view taken along line 2-2 of FIG. 1 showing the molding component with a resin input port, a vacuum output port, a resin distribution channel, a standoff having a plurality of passages, and a perimeter seal.

The molding component 10, seen in more detail in FIG. 2, is formed of a flexible body structure 12 having integrally formed therewith one or more resin input ports 14 for delivering resin (e.g., polyester resin) to an enclosed space 300 defined between the body structure 12 and the base mold 100 where a fiber lay up (e.g., fiberglass or other fiber) is disposed, and one or more vacuum output ports 16 for drawing the body structure 12 into contact with a surface 102 of the base mold 100 to shape resin/fiber combination into a finished part. Additionally, on an interfacing surface 17 of the component 10 which interfaces with a surface 102 of the base mold 100, one or more resin distribution channels 19 and one or more vacuum distribution channels 21 are formed into the surface 17 to promote the consistent flow of resin across and through the fiber lay up under the influence of a vacuum draw. As seen in FIG. 2, the resin distribution channels 19 may provide fluid communication between adjacent resin input ports 14, and likewise the vacuum distribution channels 21 may provide fluid communication between adjacent vacuum output ports 16. Additionally, in some molding processes conducted with an embodiment of system 200, either of the resin distribution channels 19 or the vacuum distribution channels 21 may be omitted from the component 10, so long as adequate resin flow and vacuum pressures may be achieved from having only one type of distribution channel (i.e., resin or vacuum) incorporated into the component 10.

As those of skill in the art appreciate with respect to closed molding techniques, resin can be delivered to the molding component 10 for flowing from the center of the component 10 to the perimeter or edge thereof, or the resin can be flowed from the edge of the component 10 towards the center thereof. The resin input ports 14 and vacuum output ports 16 are positioned according to the direction of resin flow is desired. Additionally, any number of resin input ports 14 and vacuum output ports 16 may be used to accomplish resin flow. In the exemplary arrangement shown in FIG. 1, a plurality of resin input ports 14 are spaced generally adjacent to a perimeter region 18 of the body structure 12 with one vacuum output port 16 formed at a central region 20 of the body structure 12 and optionally connected via the vacuum distribution channel 21 to any number of other vacuum output ports. FIG. 2 also shows the general pathway of resin into the system 200 (i.e., with arrow I) to flow across and through a fiber lay up positioned on the base mold surface 102 and thereby impregnate the fiber to form a part P in the enclosed space 300, and the pull of the vacuum out of the system 200 (i.e., with arrow O) to provide the negative pressure necessary for the resin flow and remove air present in the enclosed space 300.

The flexible molding component 10 is engineered out of materials that provide significant advantages when compared to traditional "B" surface tools (e.g., vacuum bags), achieving in a closed molding tooling system the fabrication of a part with high fiber-to-resin ratios. With such ratios, composite parts may be made stronger and lighter, which are highly desirable characteristics for boat hulls, aircraft frames, and other moving objects. The component 10 is preferably formed of materials such as polyurea, polyurethane, a polyurea/polyurethane compound, or other materials with similar physical characteristics, including—unlike tooling components made from polyester—a lack of natural bonding with resins used in the composite part fabrication process. These materials may also be of the aromatic, aliphatic or polyaspartic form. If the component 10 materials are of the aliphatic or polyaspartic form, then ultraviolet light (UV) curing of the laminates or gel coats used in the resin/fiber combination to form the part P may be conducted within the enclosed space 300 of the system 200 without damaging the integrity of the component 10. UV curing is often desirable because of the fast cure times of the part P and reduced chemical emissions as compared to traditional curing methods employing a catalyst. Polyurea, polyurethane, and polyurea/polyurethane compounds also provide the advantage of being configurable in a tooling component to have a broad range of hardnesses and percent elongation under force. This allows for greater flexibility in part fabrication, including the changing of a fabricated part's dimensional specifications without modifying or replacing the flexible molding component 10.

Various embodiments of the structure of the flexible molding component 10 are shown in more detail in FIGS. 2-7. One resin input port 14 and one vacuum output port 16 are sectioned to show the path of resin flow in the system 200. The flexible body structure 12 is preferably configured to have at least one perimeter seal 22 formed in the perimeter region 18, and, in the embodiments of FIGS. 2-5, a standoff 26 extending from the interfacing surface 17. Alternatively, the perimeter seal 22 could be replaced by an external seal attachable to the flexible body structure 12 in the perimeter region 18.

The standoff 26 extends laterally across the interfacing surface 17 generally for the width of the flexible body structure 12 and has a set of recessed passages 28 formed therein. The function of the standoff 26 is to provide support to the body structure 12 when the vacuum is applied thereto such that the structure 12 is not drawn so tightly against the base mold surface 102 that resin flow from the resin input port 14 to the vacuum output port 16 via the resin distribution channels 19 and vacuum distribution channels 21, across and through a fiber lay up, is not impeded. The passages 28, therefore, are needed for the resin to pass through the standoff 26 and flow in the direction of the vacuum draw. Those of skill in the art will appreciate that resin and vacuum distribution channel 19, 21 layouts other than those shown in FIGS. 4-6 may be implemented with system 200 and used in conjunction with the standoff 26 depending on the specific flow characteristics desired for the resin.

Figure 3:
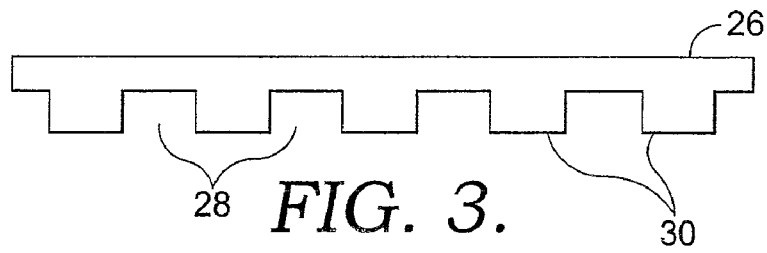
FIG. 3 shows a close-up view of the passages of the standoff.

One exemplary standoff 26 arrangement is shown in FIG. 3 formed by downwardly extending teeth 30 of the standoff 26 defining the set of laterally extending passageways 28; however any form of passageway, such as apertures extending through the standoff 26, may be implemented so long as the standoff structure (e.g., teeth 30) is rigid enough to support the integrity of the passageways 28 when a vacuum is applied to the body structure 12 and the passageways 28 have a sufficient cross-sectional area as to allow enough resin to flow to the fiber lay up in a set amount of part fabrication time.

Figure 7:
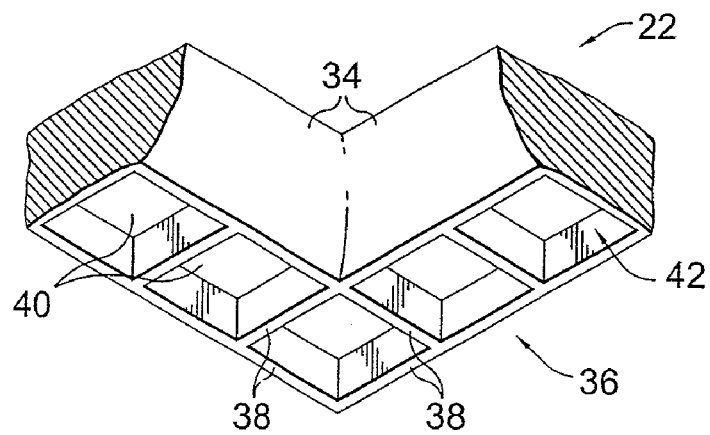
FIG. 7 is a bottom perspective close-up view of one embodiment of the perimeter seal.

The perimeter seal 22 extends completely around the perimeter of the body structure 12 to sealingly engage the base mold surface 102 and form the enclosed space 300 containing the materials for the part. The seal 22 is essentially a downward extension 32 from the body structure 12 transitioning from a sloped surface 34 to an abutting surface 36. The abutting surface 36 can be a flat surface or other surface shape having a contour that is the same as the contour of the base mold surface in that region, or as shown in FIG. 7, the surface 36 may be formed as a grid of sidewall flanges 38. These flanges 38 are formed by recessing areas 40 of the seal 22 to create a series of voids 42. Upon drawing of the vacuum in the system 200, the flanges 38 are configured to flex sufficiently enough to have a good seal with the base mold surface 102 to create the negative pressure necessary to move the interfacing surface 24 into solid contact with the part P and the base mold 100, but to have enough rigidity as to not fully collapse into the voids 42 and place excessive compressive forces on the standoff 26, which could impede the flow of resin through the passages 28. The entire perimeter seal 22 may have a consistent modulus of elasticity, or alternatively, regions of the seal above the flanges 38 may have a higher modulus of elasticity than the flanges 38 themselves, which aids in the flexing of the flanges 38 to create an adequate seal. Still further, the flanges 38 and voids 42 create attachment points where various tools may be secured to the molding component 10 to more easily move the component onto and off of the base mold 100.

Figure 4:
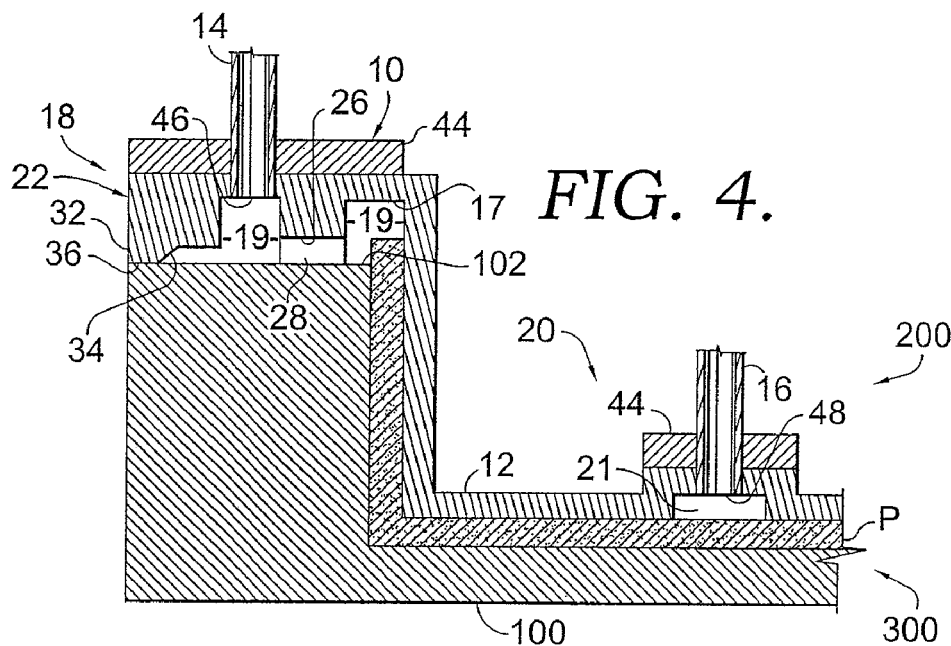
FIG. 4 is a side elevational view of the cross-section of FIG. 2 showing a reinforcement material integrated into the molding component.

FIG. 4 shows another arrangement where reinforcing material 44 is molded or otherwise integrated into the body structure 12 to create regions of the flexible molding component having varying physical properties, for example, varying densities, rigidities, and compression and elongation characteristics. For example, it may be desired for regions adjacent to the resin input port 14 and vacuum output port 16 to have an increased rigidity, such that when the vacuum is applied to the system 200 to sealingly engage the perimeter seal 22 with the base mold 100 and draw the interfacing surface 24 against the resin/fiber combination and base mold surface 102, openings 46, 48 to the input and output ports 14, 16, respectively, remain structurally intact such that adequate resin flow and vacuum pressure is maintained. Examples of reinforcing materials may include metals, such as aluminum, composites, or other materials. The weight of the reinforcing material 44 may also be used to increase the pressure on the perimeter seal 22—based on the surface area of the seal 22 that abuts the base mold 100. Configuring the seal 22 with sidewall flanges 38 further reduces the surface area of the seal 22, and in combination with the reinforcing material 44, work with the vacuum to provide a substantial clamping force with the base mold 100 to further maintain the integrity of the vacuum pressure during the fabrication process and prevent gaseous materials from leaking out of the enclosed space 300 and into the surrounding environment. Also, similar to the flanges 34 of the perimeter seal 22, the reinforcing material may provide attachment points where various tools may be secured to the molding component 10 to more easily move the component onto and off of the base mold 100, which is a significant advantage when the component 10 is large.

Figure 5:
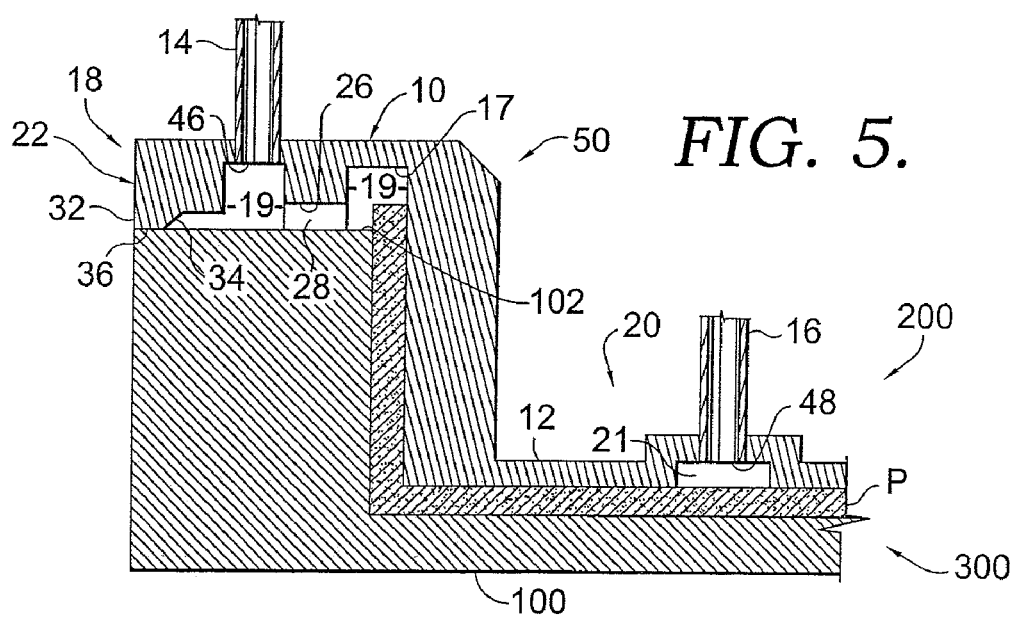
FIG. 5 is a side elevational view of the cross-section of FIG. 2 showing a region of the molding component having an increased thickness as compared to other areas of the component.

Another configuration of the flexible molding component 10 is shown in FIG. 5 where the body structure 12 has a region 50 of increased thickness. This region 50 therefore has varying physical properties as compared to other regions of the body structure 12, and can impart different physical properties onto a region of the fabricated part below the component region 50. For example, by having the increased thickness region 50, the weight thereof forces the component 10 to better conform to the surface contours of the base mold surface 102 immediately below region 50 and thereby more accurately shape the part P to the desired contour.

Figure 6:
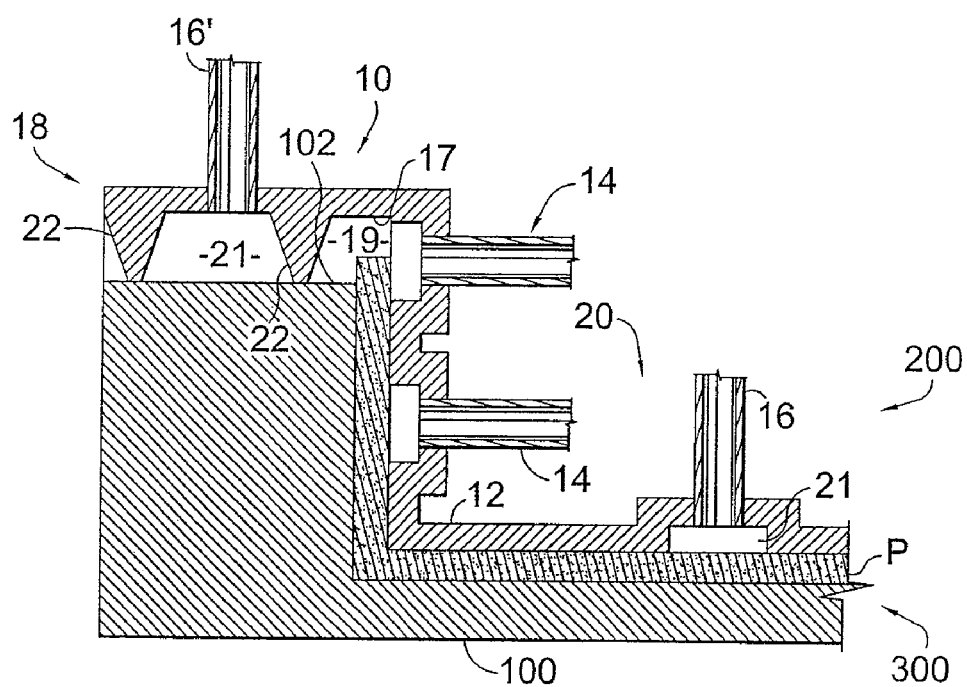
FIG. 6 is a side elevational cross-sectional view of another embodiment of the molding component of the present invention having a double perimeter seal.

FIG. 6 shows yet another embodiment of the flexible molding component 10. This embodiment of the component is similar to that shown FIG. 2, but the body structure is formed with dual perimeter seals 22 extending downward from the interfacing surface 17 preferably in the form of tapered flanges. The resin input port 14 shown in section in FIGS. 2, 4 and 5 is replaced by a perimeter-sealing vacuum output port 16' which is in fluid communication with vacuum distribution channel 21 extending generally around the perimeter of the body structure 12 between the dual perimeter seals 22. Multiple perimeter-sealing vacuum output ports 16' may be positioned to fluidly communicate with the vacuum distribution channel 21. The purpose of the dual perimeter seals 22 configuration is to facilitate the improved locking of the flanges against the base mold surface 102 when the vacuum is applied through the perimeter-sealing vacuum output port 16', because the vacuum draw for the perimeter seals is independent of the vacuum draw by the vacuum output port 16 directing the flow of the resin, it can be set at higher vacuum levels than the resin vacuum port 16. This improved locking or sealing also allows for resin to be introduced through one or more resin input ports 14—which are preferably not in fluid communication with the vacuum distribution channel 21—into the enclosed space 300 at moderate injection pressures to "push" the resin across and through the fiber lay up on the base mold surface 102 in addition to the vacuum output port 16 draw of the resin. This method will thereby increase the speed of part fabrication by moving the resin through the fiber lay up more quickly. As parts become larger, this speed advantage becomes even more pronounced. Further, as with the perimeter-sealing vacuum output ports 16', multiple resin input ports 14 may be provided on the body structure 12, and with resin distribution channels 19, for better resin distribution as needed.

It should also be understood that the flexible molding component 10 may also be used to produce fiber reinforced composite parts without injecting or otherwise introducing the resin between the body structure 12 and the base mold 100 through the resin input ports 14. Instead, the resin may be poured, rolled or sprayed onto the fiber lay up lying on the base mold surface 102 using well-known methods, and then the component 10—without resin input ports 14—is moved onto the base mold surface 102 to enclose the resin/fiber combination and the vacuum output ports 16 (or other vacuum means) apply the vacuum draw to remove air and excess resin in the enclosed space 300 of the system 200 and formed the finished part P.

Therefore, it can be seen that the flexible molding component 10 of the present invention provides a superior molding tool for reliably producing increased strength fiber reinforced composite parts in a closed molding tooling system 200. The flexible nature of the integrally formed molding component 10 avoids the necessity in the prior art of conducting the labor intensive and exacting process of building up patterns to produce a molding tool that can fabricate a part having a specific thickness. The system 200 can also be used to apply uniform pressure over virtually any size or type of surface that might require such pressure to form the finished P with the desired shape and mechanical properties. This uniform pressure application is made possible by the configurable nature of the resin input ports 14 and vacuum output ports 16—which may be placed at customized locations on the body structure 12—and the flexible nature of the body structure 12. Furthermore, since certain changes may be made in the above invention without departing from the scope hereof, it is intended that all matter contained in the above description or shown in the accompanying drawing be interpreted as illustrative and not in a limiting sense. It is also to be understood that the following claims are to cover certain generic and specific features described herein.

What is claimed is:

1. A mold component configured for use with a base mold in a closed molding process to form a composite part, said mold component comprising:
   a reusable flexible body structure formed of at least one material selected from the group consisting of polyurea, polyurethane, a polyure/polyurethane compound and mixtures thereof, said flexible body structure including a perimeter region, an interfacing surface, and having integrally formed therewith:
   at least one resin distribution channel extending across the interfacing surface and at least one vacuum distribution channel;
   a perimeter seal extending from said body structure for sealing engagement with said base mold to enclose said composite part between said body structure and said base mold; and
   at least one vacuum output port in fluid communication with each of said vacuum distribution channels and said perimeter seal thereby providing a first vacuum along said seal to assist said sealing engagement and an independent second vacuum across said interfacing surface to assist resin distribution between said body structure and said base mold.

2. The mold component of claim 1, further comprising:
   a standoff extending from said interfacing surface of said body structure; and
   a plurality of passages formed in said standoff to facilitate fluid communication between said at least one resin distribution channel and an enclosed space formed between said body structure and said base mold wherein a fiber-reinforced composite part may be formed.

3. The mold component of claim 1, wherein said flexible body structure is formed by a method selected from the group consisting of spraying, brushing, or pouring said material during the formation thereof.

4. The mold component of claim 1, wherein said material is further selected from the group consisting of aliphatic compounds, aromatic compounds, and polyaspartic compounds.

5. The mold component of claim 1, wherein said perimeter seal comprises a grid of sidewall flanges.

6. The mold component of claim 1, wherein said body structure further comprises first regions formed at said resin or vacuum distribution channels having increased rigidity as compared to the remainder of said body structure.

7. The mold component of claim 6, wherein said first regions include a reinforcing material bonded with said body structure.

8. The mold component of claim 1, wherein said body structure is formed of one or more materials thereby providing regions in said body structure with different physical properties.

9. The mold component of claim 8, said physical properties being selected from the group consisting of density, rigidity, compression, elongation, and combinations thereof.

10. The mold component of claim 1, further comprising at least one resin input port extending through said body structure and in fluid communication with at least one of said at least one resin distribution channel.

11. The mold component of claim 1, wherein said perimeter seal comprises a plurality of perimeter seals extending downwardly from said body structure and defining a vacuum distribution channel therebetween.

12. A process of forming a boat involving closed molding tooling techniques to form a fiber-reinforced composite boat against a base mold with a flexible body structured having an interfacing surface corresponding to the shape of said composite boat upon which at least one resin distribution channel and at least one vacuum distribution channels are formed and extend thereacross and at least one perimeter seal, the process comprising:
   forming a reusable unitary body structure from a material selected from the group consisting of polyurea, polyurethane, a polyure/polyurethane compound and mixtures thereof;
   placing a fiber lay up on the base mold;
   applying resin to the fiber lay up;
   moving the unitary integral body structure onto the base mold such that the fiber lay up/resin combination is covered by the interfacing surface of the unitary integral body structure; and
   drawing a first vacuum at said perimeter seal to cause said perimeter seal to sealingly engage the base mold; and
   drawing a second vacuum independent from said first vacuum through said enclosed space thereby urging the resin to travel through the resin distribution channel and across and through the fiber lay up generally in the direction of the second vacuum draw to thereby form a composite boat upon curing.

13. The process of claim 12, wherein said forming step is selected from the methods consisting of spraying, brushing, and pouring said material.

14. The process of claim 12, wherein said material is further selected from the group consisting of aliphatic compounds, aromatic compounds, and polyaspartic compounds.

15. The process of claim 12, wherein said perimeter seal comprises a grid of sidewall flanges.

16. The process of claim 12, wherein said body structure further comprises first regions formed at said resin or vacuum distribution channels having increased rigidity as compared to the remainder of said body structure.

17. The process of claim 12, wherein said first regions include a reinforcing material bonded with said body structure.

18. The process of claim 12, wherein said body structure is formed of one or more materials thereby providing regions in said body structure with different physical properties.

19. The process of claim 18, said physical properties being selected from the group consisting of density, rigidity, compression, elongation, and combinations thereof.

20. The process of claim 12, further comprising at least one resin input port extending through said body structure and in fluid communication with at least one of said at least one resin distribution channel.

21. A mold component configured for use with a base mold in a closed molding process to form a composite part, said mold component comprising:
   a reusable flexible body structure formed of at least one material selected from the group consisting of polyurea, polyurethane, a polyure/polyurethane compound and mixtures thereof, wherein said flexible body structure is formed by spraying said material during the formation thereof, and said flexible body structure including a perimeter region, an interfacing surface, and having integrally formed therewith:

at least one resin distribution channel extending across the interfacing surface and at least one vacuum distribution channel;

a perimeter seal extending from said body structure for sealing engagement with said base mold to enclose said composite part between said body structure and said base mold; and at least one vacuum output port in fluid communication with each of said vacuum distribution channels and providing a vacuum across said interfacing surface to assist resin distribution between said body structure and said base mold.

22. A process of forming a boat involving closed molding tooling techniques to form a fiber-reinforced composite boat against a base mold with a flexible body structured having an interfacing surface corresponding to the shape of said composite boat upon which at least one resin distribution channel and at least one vacuum distribution channels are formed and extend thereacross and at least one perimeter seal, the process comprising:

forming a reusable unitary body structure from a material selected from the group consisting of polyurea, polyurethane, a polyure/polyurethane compound and mixtures thereof by spraying said material during the formation thereof;

placing a fiber lay up on the base mold;

applying resin to the fiber lay up;

moving the unitary integral body structure onto the base mold such that the fiber lay up/resin combination is covered by the interfacing surface of the unitary integral body structure; and drawing a first vacuum at said perimeter seal to cause said perimeter seal to sealingly engage the base mold; and drawing a second vacuum independent from said first vacuum through said enclosed space thereby urging the resin to travel through the resin distribution channel and across and through the fiber lay up generally in the direction of the second vacuum draw to thereby form a composite boat upon curing.

\* \* \* \* \*

UNITED STATES PATENT AND TRADEMARK OFFICE
CERTIFICATE OF CORRECTION

PATENT NO. : 7,393,494 B2 Page 1 of 1
APPLICATION NO. : 11/566970
DATED : July 1, 2008
INVENTOR(S) : Robert F. Mataya and Tommy Morphis It is certified that error appears in the above-identified patent and that said Letters Patent is hereby corrected as shown below:

Title Page,
Item (73) Assignee delete "Tracker Marine LP" and replace with --Tracker Marine, L.L.C.--

Signed and Sealed this

Twenty-eighth Day of October, 2008

JON W. DUDAS
*Director of the United States Patent and Trademark Office*